(12) United States Patent
Nitsche

(10) Patent No.: US 7,637,179 B2
(45) Date of Patent: Dec. 29, 2009

(54) ACTUATING MECHANISM FOR A PARKING BRAKE

(75) Inventor: Udo Nitsche, Esslingen (DE)

(73) Assignee: Dietz-automotive GmbH & Co. KG, Dettingen/Tech (DE)

( * ) Notice: Subject to any disclaimer, the term of this patent is extended or adjusted under 35 U.S.C. 154(b) by 651 days.

(21) Appl. No.: 11/387,056

(22) Filed: Mar. 23, 2006

(65) Prior Publication Data

US 2006/0230867 A1    Oct. 19, 2006

(30) Foreign Application Priority Data

Mar. 23, 2005    (DE)    ........................ 10 2005 013 475

(51) Int. Cl.
*G05G 1/04*    (2006.01)
(52) U.S. Cl. ........................................................ 74/523
(58) Field of Classification Search ................ 74/500.5, 74/501.6, 502.2, 519, 523, 526, 527, 529, 74/533, 535, 536, 537, 543, 575
See application file for complete search history.

(56) References Cited

U.S. PATENT DOCUMENTS 3,335,621 A * 8/1967 Buchwald .................... 74/538

5,735,178 A * 4/1998 Barbunopulos .............. 74/535

FOREIGN PATENT DOCUMENTS

DE            195 21 159 C2    12/1996
DE    20 2004 014 356 U1    12/2004

* cited by examiner

*Primary Examiner*—Vicky A Johnson
(74) *Attorney, Agent, or Firm*—Venable LLP; Robert Kinberg; Steven J. Schwarz

(57) ABSTRACT

An actuating mechanism for a parking brake includes a bearing block and a handbrake lever positioned pivoting on the bearing block. A brake setting device includes a locking segment secured to the bearing block and a movably positioned locking pawl which has an edge segment facing the locking segment. An actuating linkage is positioned inside the handbrake lever and includes a web to connect the actuating linkage to the locking pawl. The web rests on the edge segment. A spring loaded push button is movable counter to a spring force to activate the actuating linkage. A catch spring is arranged to secure the locking pawl by a force of the catch spring in an engaged position on the locking segment. During actuation of the actuating linkage by the push button, a force counter to the force of the catch spring is exerted by the web onto the locking pawl, thereby causing the locking pawl to be separated from the locking segment.

14 Claims, 6 Drawing Sheets

ACTUATING MECHANISM FOR A PARKING BRAKE

CROSS-REFERENCE TO RELATED APPLICATION

This application claims the priority of German Patent Application No: 10 2005 013 475.0-21, filed on Mar. 23, 2005, the subject matter of which is incorporated herein by reference.

BACKGROUND OF THE INVENTION

The invention relates to an actuating mechanism for a parking brake, comprising a handbrake lever that is positioned pivoting on a bearing block, a brake setting device provided with a locking segment secured to the bearing block and a movably positioned locking pawl, and an actuating linkage positioned inside the handbrake lever which can be activated by a push button to move counter to the force of a spring.

An actuating mechanism of this type is known from German patent document DE 195 21 159 C2. This actuating mechanism comprises a handbrake lever that is positioned pivoting on a bearing block. A single actuating rod, which engages in a brake-setting device, is used as an actuating linkage for operating the parking brake. The actuating rod extends inside a tubular holder for the handbrake lever. The front end of the actuating rod is provided with a push button, which projects past the tubular holder and can be pushed by a person operating the brake.

The brake-setting device consists of a locking segment and a locking pawl. The locking segment is attached to the bearing block and is provided with a line of ratchet teeth. The locking pawl is positioned pivoting on a bearing journal for the handbrake lever and is pre-stressed by means of a spring element, wherein the locking pawl is positioned on the bearing journal so that it is divided into two pivoting arms, which extend on both sides of the bearing journal. One end of the first pivoting arm is provided with detents, which engage in the ratchet teeth on the locking segment to secure the locking pawl on the locking segment. The end of the second pivoting arm is attached via a link joint to the lower end of the actuating rod.

The handbrake lever is pivoted in order to operate the parking brake. The pivoting movement is transmitted via the actuating rod to the locking pawl. In an end position, the locking pawl engages in the locking segment and secures the handbrake lever in the respective position.

To release the handbrake lever from this position, the push button is pushed to release the locking pawl from the locking segment, thereby allowing the handbrake lever to be moved back to its starting position.

Actuating mechanisms of this type have the disadvantage that during the pivoting movement of the handbrake lever, the actuating rod, and thus also the push button, is moved in an axial direction and that this movement of the push button is visible to the operator. A movement of this type is undesirable, particularly if actuating mechanisms of this type are installed in passenger vehicles in the upper price range. The push button movement results from the locking pawl with its detents moving along the locking segment with the line of ratchet teeth during the pivoting of the handbrake lever, thereby generating an oscillating movement of the locking pawl, which is transmitted to the actuating rod.

A different actuating mechanism of the generic type is known from German patent document DE 20 2004 014 356 U1. The brake-setting device for this actuating mechanism is designed such that the push button on the actuating linkage is decoupled from the locking pawl movement along the locking segment during the pivoting of the handbrake lever and thus remains in the idle position. The locking pawl provided for this embodiment is positioned with its upper end pivoting on the handbrake lever. The lower end of the locking pawl is provided with a detent, which can be made to engage in the ratchet teeth on the locking segment.

An elongated hole is worked into the lower region of the locking pawl to provide a connection to the actuating linkage. A bearing pin that is attached to the front end of the actuating linkage projects into this elongated hole. The length of the elongated hole considerably exceeds the diameter of the bearing pin, so that in the actuation direction of the linkage, the bearing pin is guided with play inside the elongated hole.

In one engaged position of the handbrake lever, the detent on the locking pawl is pushed against the ratchet teeth of the locking segment with the aid of a catch spring that acts upon the locking pawl. In addition, the force of a spring, against which the push button can be activated, will push the bearing pin on the actuating linkage against the front edge, facing the locking segment, of the elongated hole in the locking pawl and help push the locking pawl against the locking segment.

For the push button activation counter to the spring force, the bearing pin, which is moved against the rear edge of the elongated hole releases the locking pawl from the engaged position in the locking segment. If the handbrake lever is subsequently pivoted, the bearing pin can freely oscillate against the actuating linkage in the elongated hole in the locking pawl. As a result, the oscillating movement generated during the pivoting of the handbrake lever is not transmitted to the actuating linkage and the push button remains in the idle position.

To achieve a secure decoupling of the push button from the oscillating movement of the locking pawl during the pivoting movement, it is necessary for the bearing pin to move without friction inside the elongated hole in the locking pawl. For this, the contour of the elongated hole is adapted to the movement curve of the bearing pin. The disadvantage of this type of arrangement, however, is that it is extremely sensitive to malfunctions. As a result of tolerances in the structural components, which always exist and in particular include tolerances in the actuating linkage components, the movement curve for the front end of the actuating linkage and thus also for the bearing pin changes and a non-frictional guidance of the bearing pin in the elongated hole is no longer ensured. In the final analysis, this leads to problems with the operation of the brake setting device. In particular, it means that a secure decoupling of the push button from the oscillating movement of the locking pawl is no longer ensured. The problem could, in principle, be solved by providing a great deal of play for the guidance of the bearing pin inside the elongated hole, even in transverse direction to the actuation direction for the actuating linkage. However, changing the elongated hole in this way would result in a lack of forced guidance between locking pawl and actuating linkage, thus reducing the function of the actuating mechanism.

SUMMARY OF THE INVENTION

It is an object of the present invention to provide an actuating mechanism of the aforementioned type, which has a simple design that is not subject to malfunctions and reliably avoids any push button movement that is visible to an operator during the pivoting movement of the handbrake lever.

The above and other an actuating mechanism for a parking brake, which according to an exemplary embodiment comprises: a bearing block; a handbrake lever positioned pivoting on the bearing block; a brake setting device including a locking segment secured to the bearing block and a movably positioned locking pawl having an edge segment facing the locking segment; an actuating linkage positioned inside the handbrake lever and including a web to connect the actuating linkage to the locking pawl, the web resting on the edge segment; a spring loaded push button movable counter to a spring force to activate the actuating linkage; a catch spring arranged to secure the locking pawl by a force of the catch spring in an engaged position on the locking segment; wherein during actuation of the actuating linkage by the push button, a force counter to the force of the catch spring is exerted by the web onto the locking pawl, thereby causing the locking pawl to be separated from the locking segment.

The connection according to the invention between the locking pawl and the actuating linkage allows for a secure decoupling of the push button from the oscillating movement of the locking pawl during the pivoting of the handbrake lever. The arrangement nonetheless has an extremely simple design, which, in particular, is not sensitive to tolerances in the individual structural components of the actuating mechanism.

It is critical that the web rests only loosely on the locking pawl segment while the locking pawl is engaged in the locking segment, without exerting any pulling force to release the locking pawl from the locking segment. For this, the actuating linkage and the spring connected to the push button are dimensioned accordingly. Furthermore, the web and the locking pawl segment are also dimensioned such that when the locking pawl is in the engaged position, the web essentially only rests with the force of its weight on the segment of the locking pawl.

It is particularly advantageous if the locking pawl segment is embodied as an indentation. In the engaged position of the locking pawl, this indentation forms a trough in the locking pawl, which is open toward the top, inside of which the web is securely positioned. It is particularly advantageous if the web contour is adapted to the shape of the indentation, so that the web rests securely and in a predetermined position in the indentation while the locking pawl is engaged.

The force necessary for securing the locking pawl in the engaged position on the locking segment is supplied solely by a catch spring, preferably designed as a leg spring, which acts upon the locking pawl end facing away from the locking segment. This relatively low spring force is sufficient for holding the locking pawl against the locking segment since the web on the actuating linkage is held inside the indentation solely by the force of gravity and does not exert any forces counter to the spring force. When activating the push button, the actuating linkage is deflected and causes the web to exert a force counter to the force of the catch spring, thus releasing the locking pawl from the locking segment.

During a subsequent pivoting movement of the handbrake lever, the locking pawl is guided across the locking segment and, in the process, carries out an oscillating movement. Since the web rests only loosely against the locking pawl, the locking pawl is deflected counter to the catch spring during the oscillating movement. As a result, the locking pawl carries out a movement relative to the web, but leaves its position unchanged so that the oscillating movement of the locking pawl is not transmitted to the push button during the pivoting of the handbrake lever.

It is particularly advantageous if the web contour is adapted to the shape of the segment on the locking pawl for accommodating the web, in particular to the shape of the indentation. As a result, the locking pawl section with the indentation does not lift completely off the web during the oscillating movement of the locking pawl, thereby permitting the guidance of the web on the locking pawl, even during the oscillating movement of the locking pawl.

Since the locking pawl segment which accommodates the web, as well as the outside contour, form relatively large contour surfaces which are also adapted to each other, this type of connection between locking pawl and actuating linkage is particularly unaffected by structural component tolerances and therefore not subject to many malfunctions.

According to one exemplary embodiment of the invention, the otherwise smooth surface of the web is provided with spaced-apart raised areas, which form discrete, line-shaped support surfaces by which the web rests on the locking pawl segment.

These discrete support surfaces prevent tilting or generally undesirable frictional forces between the locking pawl and the web, which could adversely affect the operation of the brake setting device.

The raised areas in particular are embodied so as to ensure a secure multi-point support of the web on the locking pawl segment, for different positions of the locking pawl relative to the actuating linkage. Since this multi-point support over wide regions is independent of the locking pawl position relative to the web, this type of support is not affected by structural component tolerances.

BRIEF DESCRIPTION OF THE DRAWINGS

These and other features and advantages of the invention will be further understood from the following detailed description of the exemplary embodiments with reference to the accompanying drawings in which.

DETAILED DESCRIPTION OF THE INVENTION

Figure 1:
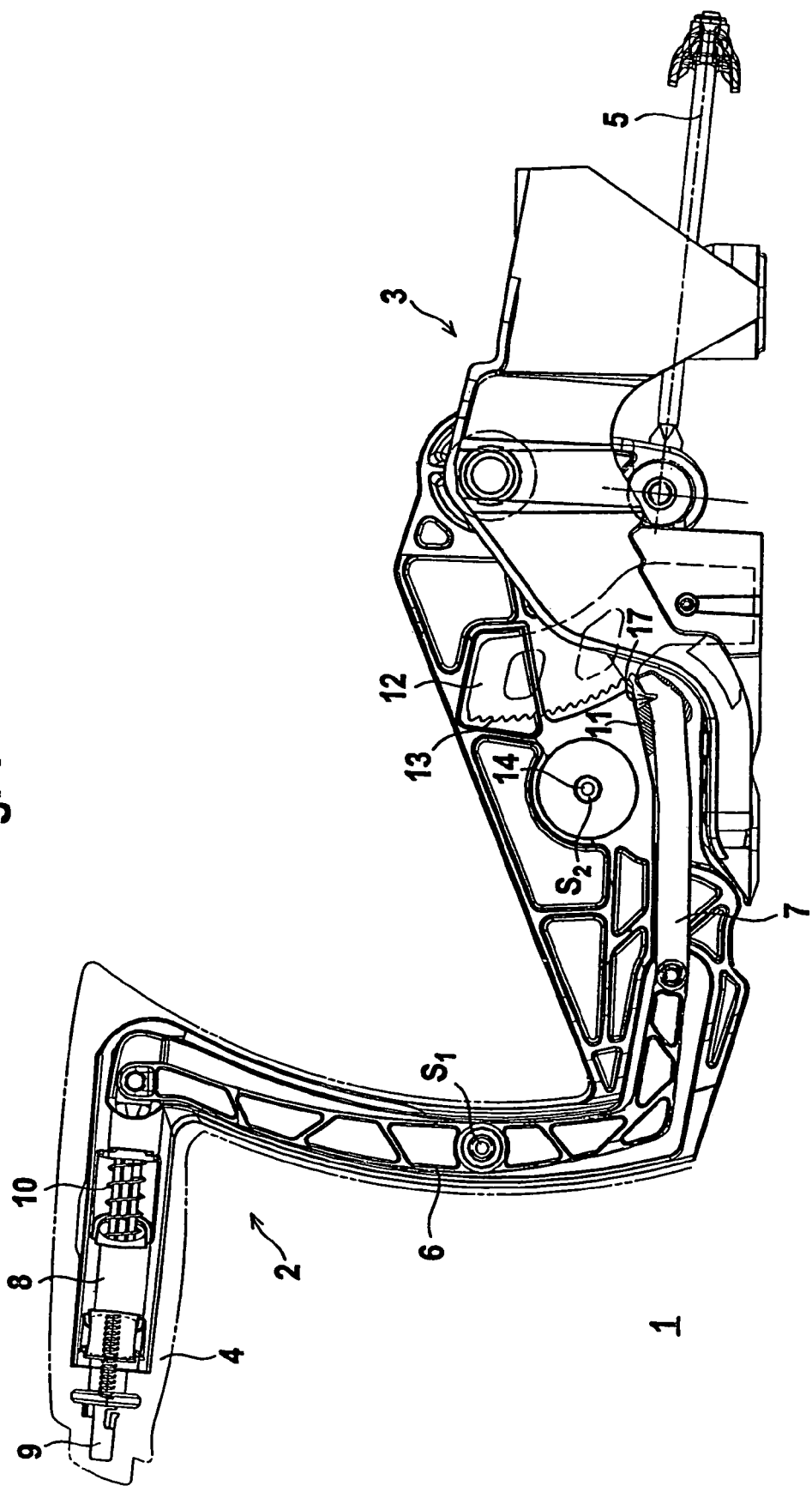
FIG. 1: Shows an exemplary embodiment of the actuating mechanism for an parking brake.

FIG. 1 shows an exemplary embodiment of the actuating mechanism 1 according to the invention for a parking brake in a motor vehicle.

The actuating mechanism 1 comprises a handbrake lever 2, which is positioned on a bearing block 3 in such a way that it can pivot around a horizontal axis. The handbrake lever 2 consists of a basic body with an adjacent grip 4 attached on the front end.

A tie rod 5 is positioned on the bearing block 3 and is connected to the handbrake lever 2. The respectively adjusted position of the handbrake lever 2 is transmitted via this tie rod 5 to the vehicle parking brake, which is not shown herein.

An actuating linkage is positioned inside the brake lever 2, which comprises a pivoting lever 6 that can pivot around an axis $S_1$ and an actuating rod 7 which is hinged to this lever, wherein the arrangement of lever segments and rod segments for the actuating linkage can differ. In particular, the actuating rod 7 can be divided into several rod segments 7a that are connected by hinges. The front end of the pivoting lever 6 is connected via a coupling element 8 to a push button 9, which projects past an opening on the front end of the grip 4 and can thus be activated by an operator. The push button 9 is activated against the force of a spring 10 in the region of the coupling element 8.

Figure 2:
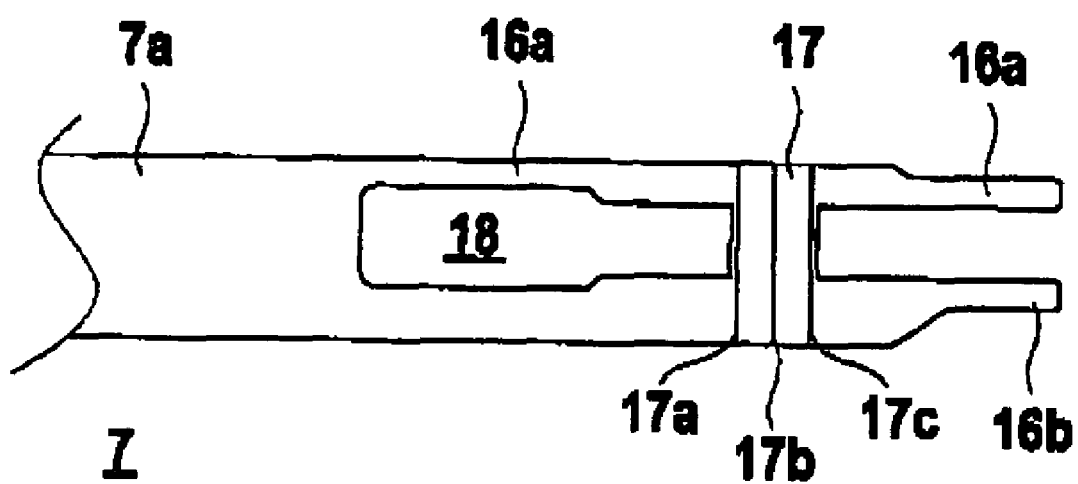
FIG. 2: Shows a view of the underside of an actuating linkage for the actuating mechanism shown in FIG. 1.

The actuating rod 7, the front end of which is shown in further detail in FIG. 2, is connected to a brake setting device. The handbrake lever 2 can be secured in a predetermined pivoting position with this brake-setting device, which is illustrated in further detail in FIGS. 3 to 5.

The brake-setting device is provided with a locking pawl 11 and a locking segment 12. The locking segment 12 is attached to the bearing block 3 and is provided with a line of ratchet teeth 13 along one edge. The respectively identical ratchet teeth 13 are arranged successively along this edge. For the present embodiment, the ratchet teeth 13 have a triangular shape. The locking pawl 11 is provided with a detent 11a at its lower end, which can be made to engage in the ratchet teeth 13 on the locking segment 12.

Figure 3:
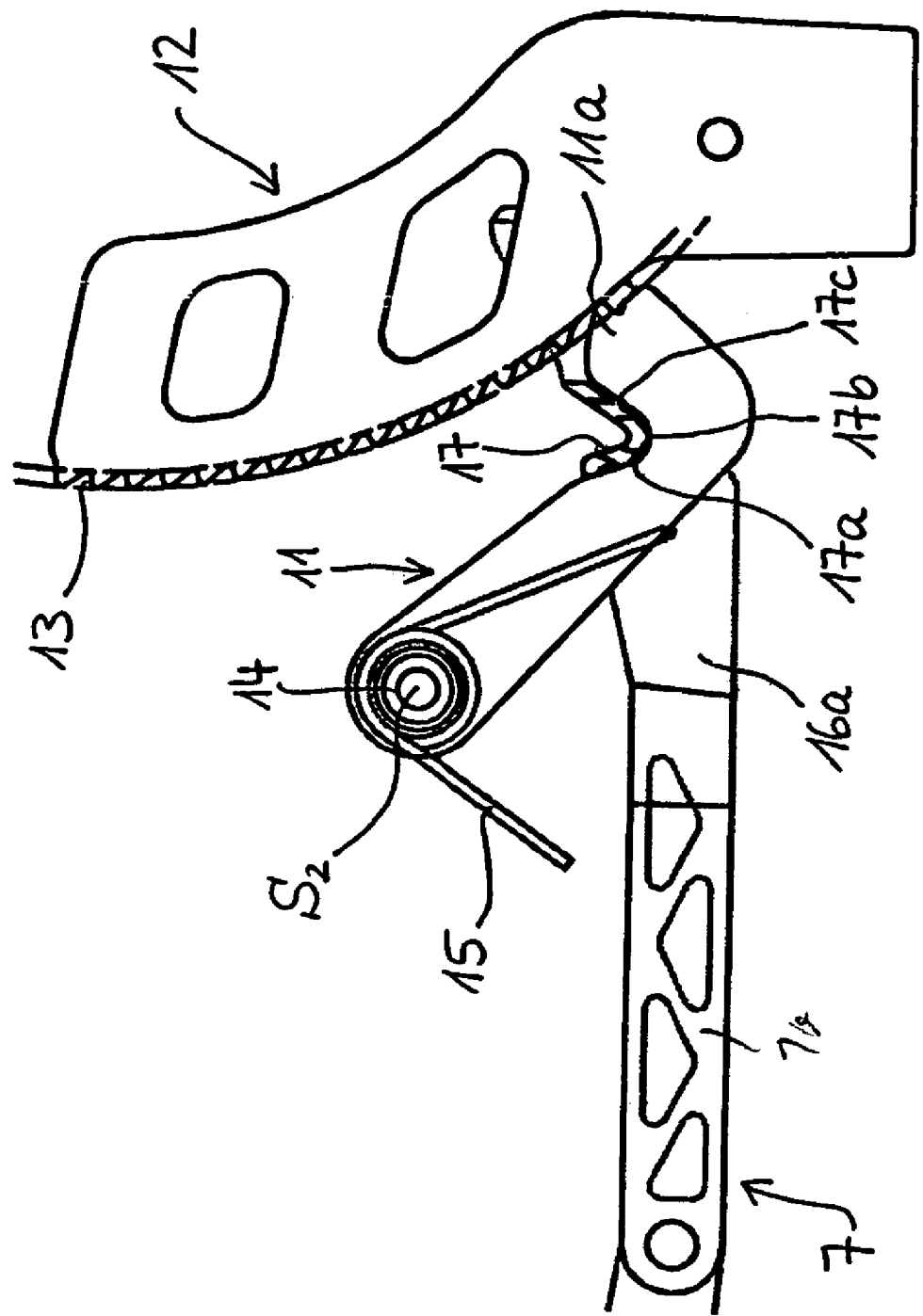
FIG. 3: Shows a partial view of the actuating mechanism according to FIG. 1, with a locking pawl in a latched-in position on a locking segment.
Figure 4:
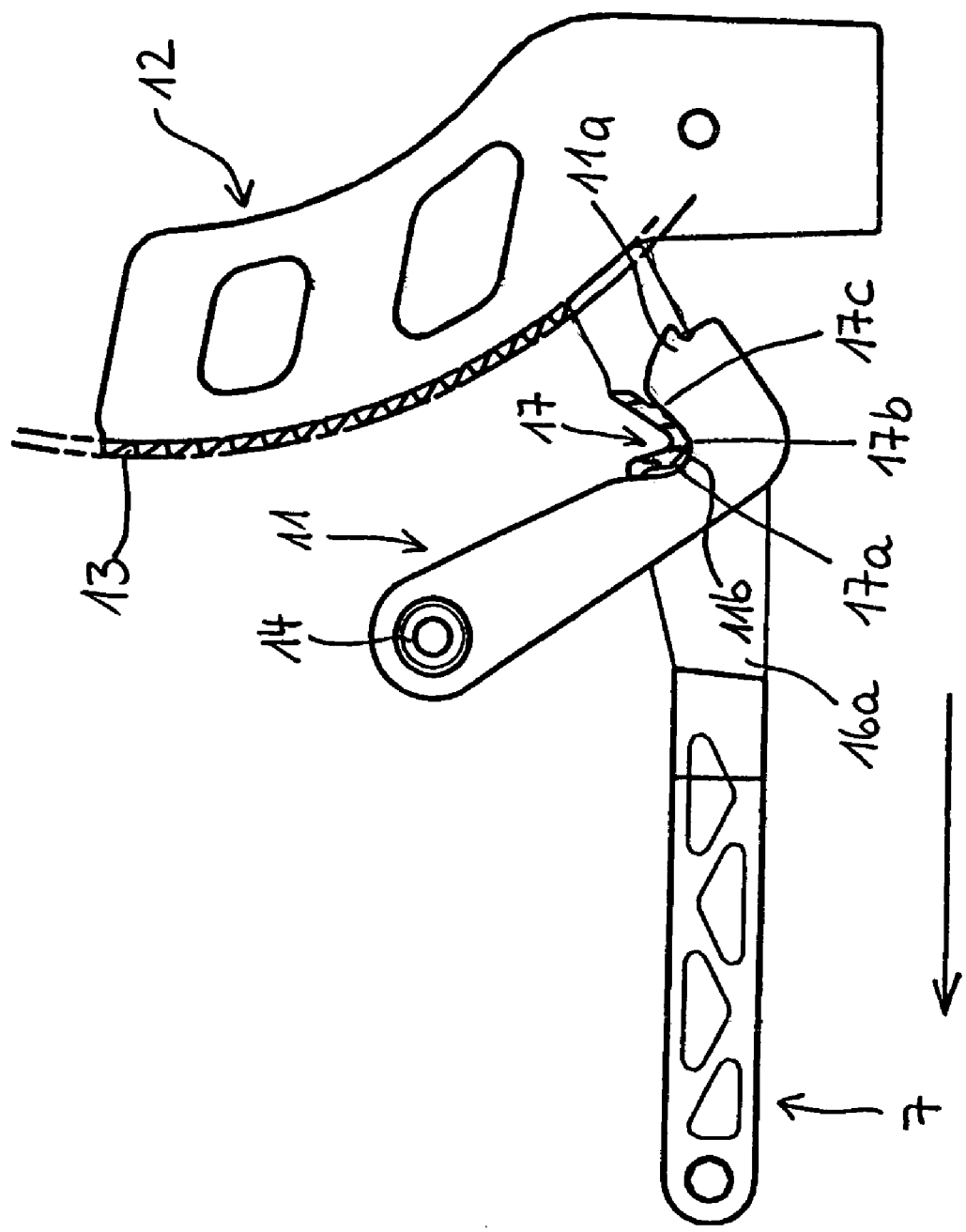
FIG. 4: Shows an arrangement according to FIG. 3, for which the locking pawl is separated from the locking segment.
Figure 5:
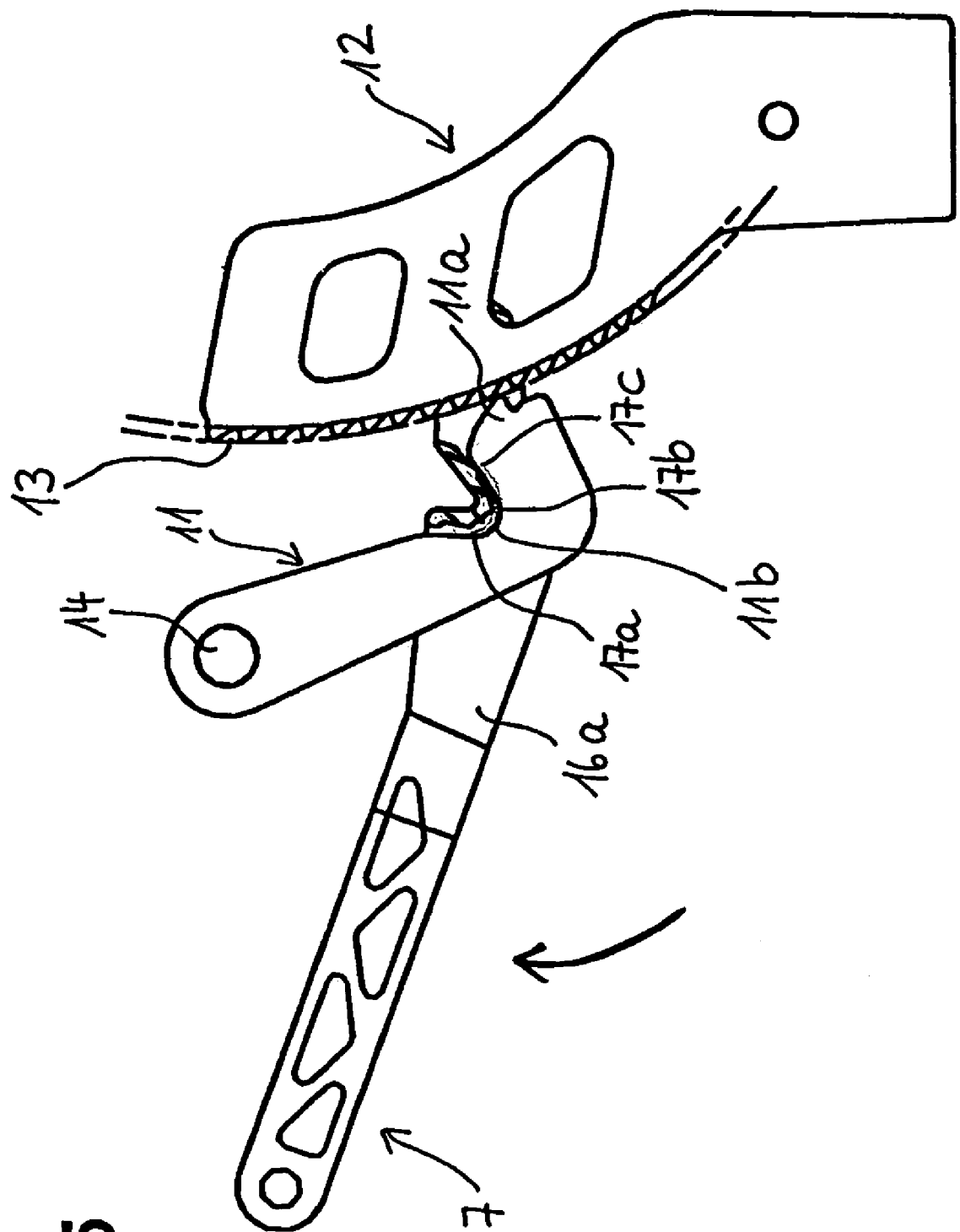
FIG. 5: Shows an arrangement according to FIG. 3 for which the locking pawl is guided across the locking segment.

FIGS. 3 to 5 in particular show that the locking pawl 11 is essentially L-shaped. The upper end of the locking pawl 11 is attached to the handbrake lever 2, such that it can pivot on a bearing journal 14 and around a pivoting axis $S_2$. The locking pawl 11 section adjacent to the bearing journal 14 forms a pivoting arm with a projection jutting out on the lower end, on which the detent 11a is arranged. A catch spring 15 in the form of a leg spring is furthermore provided in the region of bearing journal 14. This catch spring 15 acts upon the edge of locking pawl 11, which faces away from the locking segment 12 and thus exerts a force onto the locking pawl 11 in the direction of the locking segment 12.

In order to connect the actuating rod 7 of the actuating linkage, the locking pawl 11 is provided with an indentation 11b, which is formed by an edge section on the locking pawl 11 that faces the locking segment 12, in the area of transition between pivoting arm and projection. The indentation 11b is V-shaped as can be seen in FIGS. 3 to 5.

FIG. 2 shows the frontal section of the actuating rod 7 that faces the locking segment 12, which for the present case is a plastic injection-molded part. The back portion of the actuating rod 7, in the form of a solid rod section 7a, is followed by a fork-shaped receptacle with two fork arms 16a, b that extend at a distance to each other in the longitudinal direction of the actuating rod 7.

The two fork arms 16a, b are connected to each other by a web 17, wherein the fork arms 16a, b, the web 17, and the solid rod section 7a jointly form one piece.

The fork arm segments 16a, b, the web 17 and the front edge of the rod segment 7a delimit a hollow space 18 into which the locking pawl 11 is inserted once the control mechanism 1 is completely assembled. The dimension of the hollow space 18 in the longitudinal direction of the actuating rod 7, and thus in the actuating direction of the actuating linkage, is greater than the width of the locking pawl 11, so that the locking pawl 11 is positioned with play inside the hollow space 18. The segments of the fork arms 16a, b, which adjoin the web 17 and delimit the hollow space 18, are only spaced apart enough to allow the side surfaces of the locking pawl 11 to fit tightly in this portion of the hollow space 18. The locking pawl 11 is therefore guided with play inside the hollow space 18, but only in the actuating direction for the actuating linkage, and is guided forcibly in the lateral direction.

Figure 6:
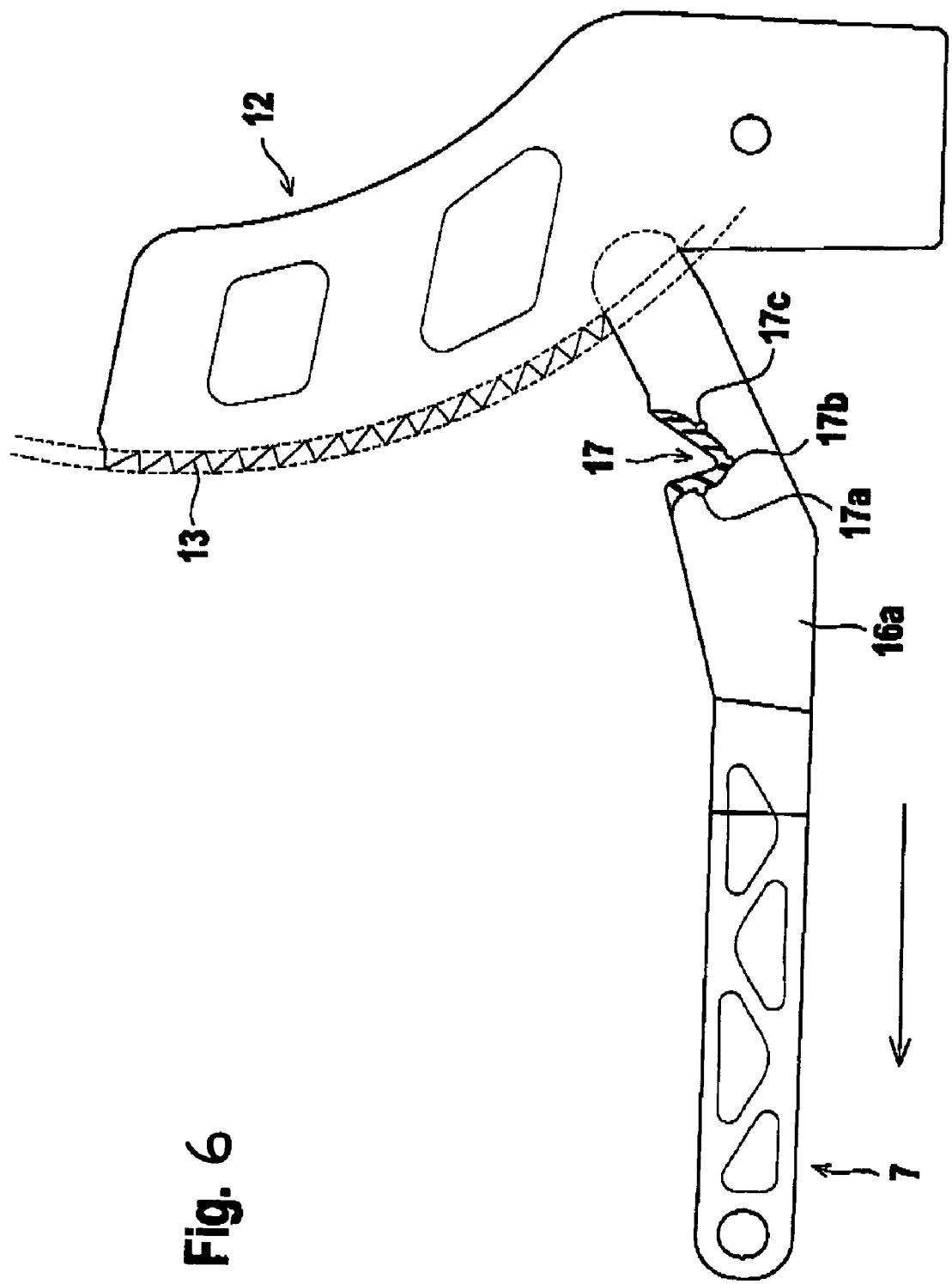
FIG. 6: Shows an arrangement similar to FIG. 4, with the locking pawl removed.

The free ends of the fork arms 16a, b, which project over the web 17, extend into the region of the locking segment 12 once the actuating mechanism is fully assembled, as shown in particular in FIGS. 1 and 3 to 5, wherein the fork arm 16b is removed so that only fork arm 16a is visible. This forced guidance makes it possible to avoid an undesirable tilting or tipping of the components of the brake-setting device. FIG. 6 is a view similar to FIG. 4, with the locking pawl removed. The web 17, shown in cross section in FIGS. 3-6, extends between the fork arms 16a and 16b, wherein the fork arm 16b is not shown for ease of illustration.

The contour of the web 17 is adapted to the form of the indentation 11b in the locking pawl 11. Accordingly, the web 17 has a substantially V-shaped cross section as can be seen in FIGS. 3 to 5. Three raised areas 17a-c project from the otherwise smooth surface of the web 17 and are formed integrally with the web 17. The raised areas 17a-c respectively extend across the complete width of the web 17. These raised areas 17a-c have identical shapes with a constant cross section and extend along a straight line, meaning the raised areas 17a-c extend parallel and at a distance to each other. The raised area 17b in the center is located at the lower vertex of the web 17 while the other two raised areas 17a, c are positioned one on each side, at a distance to this area 17b in the center.

The raised areas 17a-c form discrete, linear and spatially tightly delimited supporting points by means of which the web 17 rests on the surface of the indentation 11b.

Since the indentation 11b on the locking pawl 11 forms a trough that opens up toward the top, the web 17 is held inside the indentation 11b by the force of gravity.

FIGS. 3 to 5 here show the position of the web 17 inside the indentation 11b on the locking pawl 11, for various setting positions of the brake-setting device.

FIG. 3 shows the brake setting device with the actuating rod 7 for the case where the handbrake lever 2 is tightened. In order to secure the handbrake lever 2, the locking pawl 11 is in the engaged position on the locking segment 12, meaning the detent 11a on the locking pawl 11 is engaged in the ratchet teeth 13 of the locking segment 12 and is held in this position by the force of the catch spring 15.

The spring 10 in the region of the push button 9, and the actuating linkage, in particular the actuating rod 7, are dimensioned such that the web 17 rests in the indentation 11b on the locking pawl 11 and is held in this position by the force of gravity. For this, the actuating rod 7 and especially the positioning of the web 17 thereon are dimensioned such that in the engaged position of locking pawl 11, the web 17 does not exert a pulling force worth mentioning in the direction counter to the force of the catch spring 15. As a result, the catch spring 15 will securely hold the locking pawl 11 in the engaged position on the locking segment 12.

This type of arrangement is not sensitive to differences in the tolerances of the individual structural components for the actuating mechanism 1. The web 17 on the actuating rod 7 is positioned such that it rests with all three raised areas 17a-c, or only with the raised areas 17b, c, in the indentation 11b. Thus, even in the case of fluctuations in the component tolerances, it is ensured that the web 17 does not exert a pulling force or a pulling force worth mentioning counter to the force of catch spring 15, which could result in a separation between locking pawl 11 and locking segment 12.

FIG. 4 shows the activation of the push button 9 for the arrangement according to FIG. 3. By activating the push button 9 counter to the force of the spring 10, the pivoting lever 6 is pivoted with respect to the pivoting axis $S_1$, thereby causing the actuating rod 7 to be deflected in the direction characterized with an arrow in FIG. 4. With the aid of the web 17, the locking pawl 11 is also deflected in the same direction, counter to the force of catch spring 15, and is thus released from the locking segment 12. As a result of the force of gravity, the web 17 remains inside the indentation 11b. The fact that the web 17 is supported only in some points in the indentation 11b, with the aid of the raised areas 17a-c, ensures that the web 17 does not tilt inside the indentation 11b during the pivoting movement of the locking pawl 11 and the therewith connected change in the position of the indentation 11b. The raised areas 17a-c of the web 17 consequently rest even during the pivoting movement inside the indentation 11b, thereby ensuring a continuous guidance with low friction of the web 17 inside the indentation 11b.

FIG. 5 shows the pivoting of the handbrake lever 2 for the arrangement according to FIG. 3. As a result of this pivoting movement, the actuating rod 7 is moved upward, in the direction characterized with an arrow in FIG. 5. In the process, the detent 11a of locking pawl 11 is moved across the ratchet teeth 13 on the locking segment 12.

The V-shaped design of the indentation 11b ensures that even during the pivoting movement of the actuating rod 7, the web 17 is positioned securely inside the indentation 11b as a result of the force of gravity.

Corresponding to the design for the ratchet teeth 13 and the detent 11a, the locking pawl 11 performs an oscillating movement with a certain lift when it is guided along the locking segment 12.

Owing to the loose connection between the locking pawl 11 and the actuating rod 7 via the web 17, the oscillating movement of the locking pawl 11 is not transmitted to the actuating linkage during the movement across the locking segment 12, so that the push button 9 remains in the idle position during the pivoting movement of the handbrake lever 2.

FIG. 5 illustrates the locking pawl 11 movement relative to the web 17 for the deflection of the locking pawl 11, caused by the ratchet teeth 13 of the locking segment 12. By guiding the detent 11a of the locking pawl 11 across the ratchet teeth 13 on the locking segment 12, the locking pawl 11 is deflected counter to the force of the catch spring 15. As a result of this deflection movement, the web 17 is partially lifted off the indentation 11b. FIG. 5 shows the indentation 11b on the locking pawl 11 with the partially lifted off web 17. For this, the raised area 17a on the web 17 is positioned at a longer distance to the surface of the indentation 11b than the second raised area 17b which is positioned at a shorter distance to the surface of the indentation 11b. Owing to the force of gravity, however, the web 17 with the raised area 17c still rests partially against the indentation 11b and a guidance of the web 17 on the indentation 11b is still possible.

The lift in the locking pawl 11 movement during the guided movement along the locking segment 12 is less than the play of the locking pawl 11 in the hollow space 18 between the fork arms 16a, b. This ensures that the locking pawl 11 does not impact with the front edge of the rod segment 7a on the actuating rod 7 during the oscillating movement. A transmission of the locking pawl 11 movement via the actuating linkage to the push button 9 is thus avoided.

It will be understood that the above description of the present invention is susceptible to various modifications, changes and adaptations, and the same are intended to be comprehended within the meaning and range of equivalents of the appended claims.

What is claimed is:

1. An actuating mechanism for a parking brake, comprising:
   a bearing block;
   a handbrake lever positioned pivoting on the bearing block;
   a brake setting device including a locking segment secured to the bearing block and a movably positioned locking pawl, the locking pawl having:
      an edge segment facing the locking segment, and
      an indentation in the edge segment, the indentation having discreet surfaces;
   an actuating linkage positioned inside the handbrake lever and including a web to connect the actuating linkage to the locking pawl, the web contoured to engage the indentation in the edge segment of the locking pawl;
   a spring loaded push button movable to activate the actuating linkage; and
   a catch spring arranged to secure the locking pawl in an engaged position on the locking segment;
   wherein during actuation of the actuating linkage by the push button, the web engages the discreet surfaces in the indentation in the edge segment of the locking pawl and exerts a force counter to the force of the catch spring to separate the locking pawl from the locking segment, and during pivoting of the handbrake lever, contact between the locking pawl and the locking segment disengages the web from the discreet surfaces in the indentation in the edge segment of the locking pawl.

2. The actuating mechanism as defined in claim 1, wherein the actuating linkage has a front end that faces the locking segment and includes two fork arms, the web being connected between the two fork arms.

3. The actuating mechanism as defined in claim 2, wherein the actuating linkage comprises a plastic injection-molded part.

4. The actuating mechanism as defined in claim 2, wherein the locking pawl is guided in an operating direction of the actuating linkage with play inside the two fork arms, and further wherein the play accommodates a lift movement of the locking pawl during guidance across the locking segment.

5. The actuating mechanism as defined in claim 4, wherein the locking segment includes an edge having a line of ratchet teeth, and the locking pawl includes a detent that engages in the line of ratchet teeth in an engaged position of the locking pawl, and the ratchet teeth have a shape that determines the lift movement of the locking pawl.

6. The actuating mechanism as defined in claim 5, wherein the locking pawl is L-shaped and includes a pivoting arm with an upper end positioned pivoting on the handbrake lever and a lower end that includes a projection with a detent.

7. The actuating mechanism as defined in claim 6, wherein the indentation is located between the upper end of the pivoting arm and the projection.

8. The actuating mechanism as defined in claim 7, wherein the web has a substantially V-shaped cross section.

9. The actuating mechanism as defined in claim 8, wherein the edge segment of the web has raised areas that define the indentation on the locking pawl.

10. The actuating mechanism as defined in claim 9, wherein the raised areas are identically shaped.

11. The actuating mechanism as defined in claim 9, wherein the raised areas respectively extend across the complete width of the web.

12. The actuating mechanism as defined in claim 11, wherein the raised areas have longitudinal axes that extend parallel and at a distance to each other.

13. The actuating mechanism as defined in claim 11, wherein the each raised area has a cross section that is constant over the complete length.

14. The actuating mechanism as defined in claim 1, wherein the catch spring is a leg spring that fits against an edge of the locking pawl that faces away from the locking segment.

* * * * *

UNITED STATES PATENT AND TRADEMARK OFFICE
CERTIFICATE OF CORRECTION

PATENT NO. : 7,637,179 B2  Page 1 of 1
APPLICATION NO. : 11/387056
DATED : December 29, 2009
INVENTOR(S) : Udo Nitsche It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Ninth Day of November, 2010

David J. Kappos
*Director of the United States Patent and Trademark Office*